324-77
SEARCH ROOM
May 2, 1967 N. MARCHAND 3,317,831
DELAY LINE FILTER WHEREIN PLURAL DELAY LINES ARE SERIES CONNECTED, THE TIME DELAYS OF WHICH INCREASE IN AN ARITHMETIC PROGRESSION
Filed May 28, 1962
FIG. 1
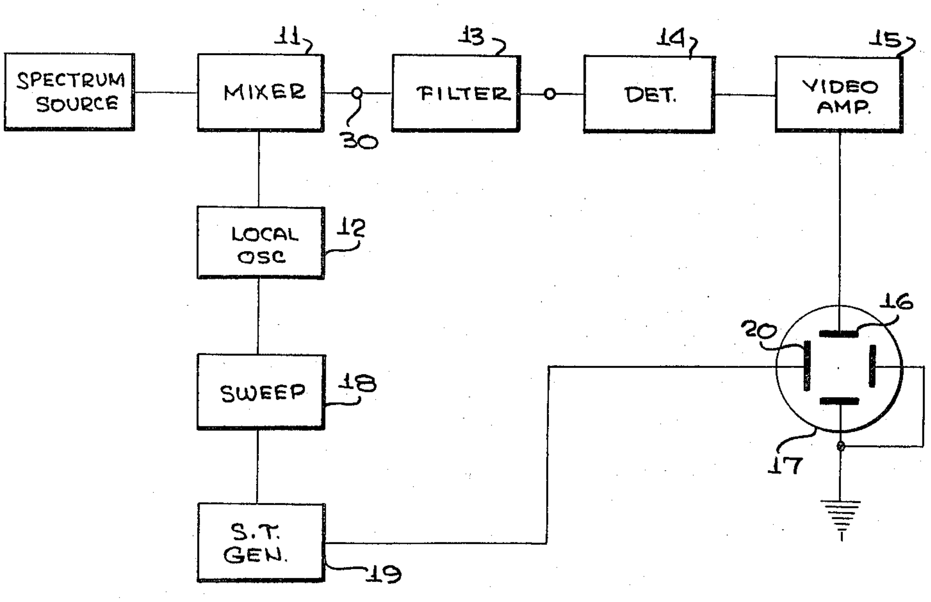
FIG. 2
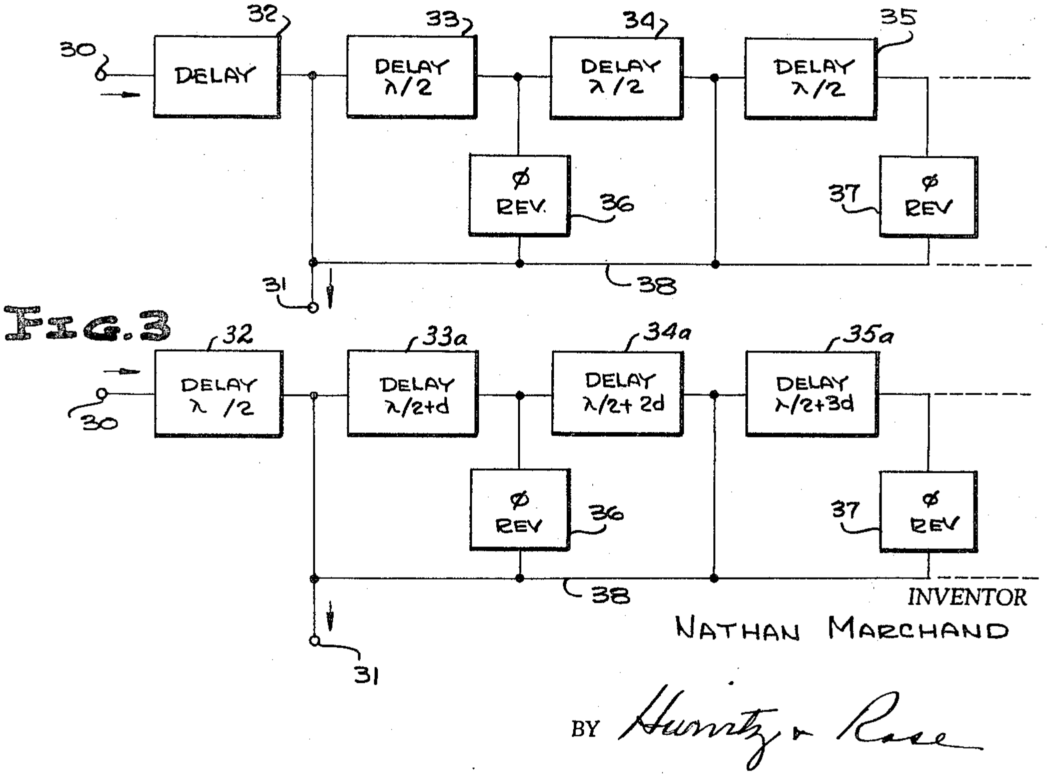
FIG. 2, FIG. 3
INVENTOR
NATHAN MARCHAND
BY Hurvitz & Rose
ATTORNEYS

United States Patent Office 3,317,831
Patented May 2, 1967

3,317,831
DELAY LINE FILTER WHEREIN PLURAL DELAY LINES ARE SERIES CONNECTED, THE TIME DELAYS OF WHICH INCREASE IN AN ARITHMETIC PROGRESSION

Nathan Marchand, Greenwich, Conn., assignor, by mesne assignments, to The Singer Company, a corporation of New Jersey Filed May 28, 1962, Ser. No. 198,278
5 Claims. (Cl. 324—77)

The present invention relates generally to spectrum analyzers and more particularly to scanning spectrum analyzers utilizing delay line filters responsive only to signals in process of frequency scanning at a predetermined rate.

The conventional frequency scanning spectrum analyzer is essentially a superheterodyne receiver in which the local oscillator is periodically tuned over a range of frequencies, and the response of the receiver plotted visually as a function of local oscillator frequency. The intermediate frequency filter of a scanning spectrum analyzer may take any form, and in particular delay line filters may be employed. The term "delay line filter" implies a filter constructed of plural series connected delay line segments each of which introduces a delay of one half wave length, the sum of the outputs of the delay line segments being added in phase to provide a filter output signal. Such a filter provides maximum response for frequencies for which delay per delay line section is one half wave length ($\lambda/2$), and response drops off for all other frequencies. Such a filter response to any frequency to which it is tuned, whether noise or desired signal. Its performance can only exceed that of a conventional filter by sufficiently increasing the number of delay line sections, which renders the filter complex and costly.

In the case of a scanning system, use of equal $\lambda/2$ delay line sections in a filter results in progressive failure of the filter to provide maximum response, as scanning velocity increases from zero. To attain maximum filter response in a delay line filter subjected to a frequency scanning signal, the successive delay line sections must be progressively of different delay time, to compensate for the fact that as the signal at one frequency travels along the delay line, the input signal frequency applied to the delay line filter, and hence the phase of the latter signal is changed. Specifically, a progressive delay time increases per delay section of a cascaded delay line filter must be inserted, equal to the number of degrees increase in phase per half cycle of sweep frequency, assuming an increasing sweep frequency. For a decreasing sweep frequency, a delay time decrease is utilized.

It is, accordingly, a broad object of the present invention to provide a novel scanning spectrum analyzer.

It is another object of the invention to provide a filter subjected to a frequency scanning signal, in the form of multiple cascaded delay lines, which are compensated in respect to delay time for rate of frequency scan.

The above and still further objects, features and advantages of the present invention will become apparent upon consideration of the folowing detailed description of one specific embodiment thereof, especially when taken in conjunction with the accompanying drawings, wherein:

FIGURE 1 is a block diagram of a conventional scanning spectrum analyzer;

FIGURE 2 is a block diagram of a conventional delay line filter employable in the system of FIGURE 1; and FIGURE 3 is a block diagram of a modified delay line filter, similar to the filter of FIGURE 2, but compensated for a specific rate of frequency scan.

Referring now to the drawings, the reference numeral 10 denotes a spectrum source, normally relatively wide band. The spectrum is applied to a heterodyne mixer 11, to which is also applied the output of a scanning local oscillator 12. The scanning frequency range is selected to sequentially convert the frequencies of the spectrum to the pass frequency of band pass filter 13, connected in cascade with mixer 11. The output of filter 13 is detected in detector 14, the output of the latter amplified in video amplifier 15, and the video output of the latter applied to the vertical deflection electrode 16 of a cathode ray tube 17, employed as a typical indicator.

The frequency of local oscillator 12 is caused to scan by means of a sweep circuit 18, such as a reactance tube tuner, to which is applied a sweep voltage from a sawtooth generator 19. The output of the latter is applied to horizontal deflection electrode 20 of cathode ray tube 16, to provide a frequency base line.

It is feasible to utilize as a filter, at 13, a delay line filter such as is illustrated in FIGURE 2 of the accompanying drawings. In FIGURE 2, the input signal is applied to terminal 30 and derived from terminal 31. The filter of FIGURE 2 is a band pass filter, the selectivity of which becomes greater as the number of sections is increased.

The signal at terminal 30 is applied to cascaded delay line sections 32, 33, 34, 35 et cetera, each of which introduces a delay of $\lambda/2$ at the center of the desired pass band, where $\lambda$ is the wave length of the signal at the desired frequency. The outputs of delay line sections 33, 35, are reversed in phase reversers 36, 37, while the outputs of delay line sections 32, 34 are unreversed in phase. The outputs of delay line sections 32, 34 and the phase reversed outputs of phase reversers 36, 37, are combined on a line 38, which is connected to output terminal 31. All the signal therefore add in phase, for the wave length $\lambda$, but for all other frequencies fail to add in phase. The system therefore has a filtering action by discriminating in favor of signals at wave length $\lambda$, and against those deviating from $\lambda$.

The signal applied to terminal 30 may be a frequency scanning signal. In such case the frequency of the signal at terminal 30 is always different than the frequency of the signal at any other point along the delay line, and the phase relations along the line are disturbed, so that for the desired output frequency the separate outputs from the several delay line sections fail to add in phase.

According to the present invention, illustrated in FIGURE 3 of the accompanying drawings, the second, third, fourth, et cetera delay line segments, **33*a*—35*a***, have progressively increasing delays, *d*. Each successive delay line segment includes an additional increment *d* of delay, sufficient to introduce a phase delay increment at frequency $1/\lambda$ equal in degrees to one half cycle of sweep rate. If, for example, the local oscillator 12, FIGURE 1, increases its own frequency at the rate of 10° per cycle of oscillator frequency, the added delay increment *d*, per delay line section, should be 5°. Thereby, the rate of frequency scan of the signal input to the filter is compensated, and all signals for a given input frequency $1/\lambda$, at terminal 30, provide co-phasal outputs at bus 38.

The value of *d* may be positive or negative, according to the direction of frequency sweep at terminal 30, i.e. increasing or decreasing. The latter may or may not be the same as exists at oscillator 12, depending on the character of the conversion in mixer 11. Positive values of *d* imply increasing frequencies at terminal 30.

Where the input wave length at terminal 30 is such that λ is the spacing between delay sections, instead of λ/2, $d$ will become $2d$, and the signals at bus 38 will no longer add in phase. The system therefor operates on fundamentals, but not on harmonics. Accordingly, the system can be made wide band.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A scanning spectrum analyzer for analyzing a relatively wide frequency spectrum, comprising frequency scanning means for converting the frequencies of said spectrum in succession to a signal of reference frequency, and a band pass filter responsive to said reference frequency, said band pass filter including a plurality of cascaded delay line sections, having delays in succession of $\lambda/2$, $\lambda/2+d$, $\lambda/2+2d$, . . . $\lambda/2+nd$, where λ is the reciprocal of the reference frequency, $n$ is the number of the delay line sections in the cascade, and $d$ is a delay time increment equal to the number of degrees of change in phase of the signal of reference frequency for each half cycle of sweep of said reference frequency, means for reversing the phase of the output of alternate ones of said delay line sections, and means for combining the outputs of all said delay line sections including the phase reversals to provide co-phasal addition of all said outputs during said frequency scanning.

2. A frequency scanning system of spectrum analysis, said system including a band response filter and frequency scanning means for sweeping the frequency of a signal past a response frequency of said filter, said filter being of the cascaded delay line type and including multiple cascaded delay line sections, having algebraically added to said delay line sections taken in order in the cascade progressively increased values $d$ of delay proportional to the position of the section in the delay line, where $d$ may be positive or negative and is selected to compensate for phase shift error introduced by the frequency scanning of said frequency scanning means.

3. A filter for a frequency scanning wave having a wave length λ and a rate of scan $\Delta f$ cycles per second, said filter including a plurality of delay line sections having delays $\lambda/2$, $\lambda/2+d$, $\lambda/2+2d$ . . . $\lambda/2+nd$, where $d$ is selected to compensate for phase shift error introduced by $\Delta f$, and means for co-phasally adding the signal outputs of said delay line sections.

4. A filter for a frequency scanning wave having a constant phase change with time, said filter including plural delay lines of different delay times connected in cascade, and means for co-phasally combining the signal outputs of said filters, the delay times of said delay lines being selected to compensate for said phase change with time.

5. The combination according to claim 4 wherein said delay lines have delay times equal to half the wave length of a predetermined signal, plus $nd$, where $n$ takes on successive values determined by the position of the delay line in the cascade and $d$ is the delay time required to compensate for said phase change with time.

References Cited by the Examiner

UNITED STATES PATENTS

| | | | |
|---|---|---|---|
| 1,994,232 | 3/1935 | Schuck | 324—77 X |
| 2,263,376 | 11/1941 | Blumlein et al. | 333—29 X |
| 2,897,442 | 7/1959 | Wright et al. | 333—29 X |
| 2,916,724 | 12/1959 | Peterson | 333—70 X |
| 2,942,195 | 6/1960 | Dean | 333—70 X |
| 2,954,465 | 9/1960 | White | 324—77 X |
| 2,988,713 | 6/1961 | Fukata | 333—29 X |

WALTER L. CARLSON, *Primary Examiner.*

A. E. RICHMOND, P. F. WILLE, *Assistant Examiners.*